June 23, 1925. 1,542,943
W. S. JOSEPHSON
VEHICLE WHEEL
Filed Aug. 11, 1923 2 Sheets-Sheet 1

Inventor:
Walter S. Josephson
By Vivian E. Hodges
Atty.

June 23, 1925.

W. S. JOSEPHSON

VEHICLE WHEEL

Filed Aug. 11, 1923

Inventor,
Walter S. Josephson
By Vernon E. Hodges Atty.

Patented June 23, 1925.

1,542,943

UNITED STATES PATENT OFFICE.

WALTER S. JOSEPHSON, OF NEW YORK, N. Y., ASSIGNOR TO GEORGE WHITAKER MORLEY AND ROBERT ROY ARMSTRONG, TRUSTEES, OF TORONTO, ONTARIO, CANADA.

VEHICLE WHEEL.

Application filed August 11, 1923. Serial No. 656,799.

*To all whom it may concern:*

Be it known that I, WALTER S. JOSEPHSON, a citizen of the United States, residing at New York city, in the county of New York and State of New York, have invented certain new and useful Improvements in Vehicle Wheels, of which the following is a specification.

My invention relates to an improvement in vehicle wheels.

The object is to provide a wheel of shock insulating qualities particularly adapted for use with automobiles and trucks.

The present wheel includes a hub, a rim, means such as disks or spokes extending between the hub and rim, more or less semispherical - cups connected with the said means and rim, and forming self-adjusting seats for resilient insulating devices held therebetween.

In the accompanying drawings:—

Figure 1:
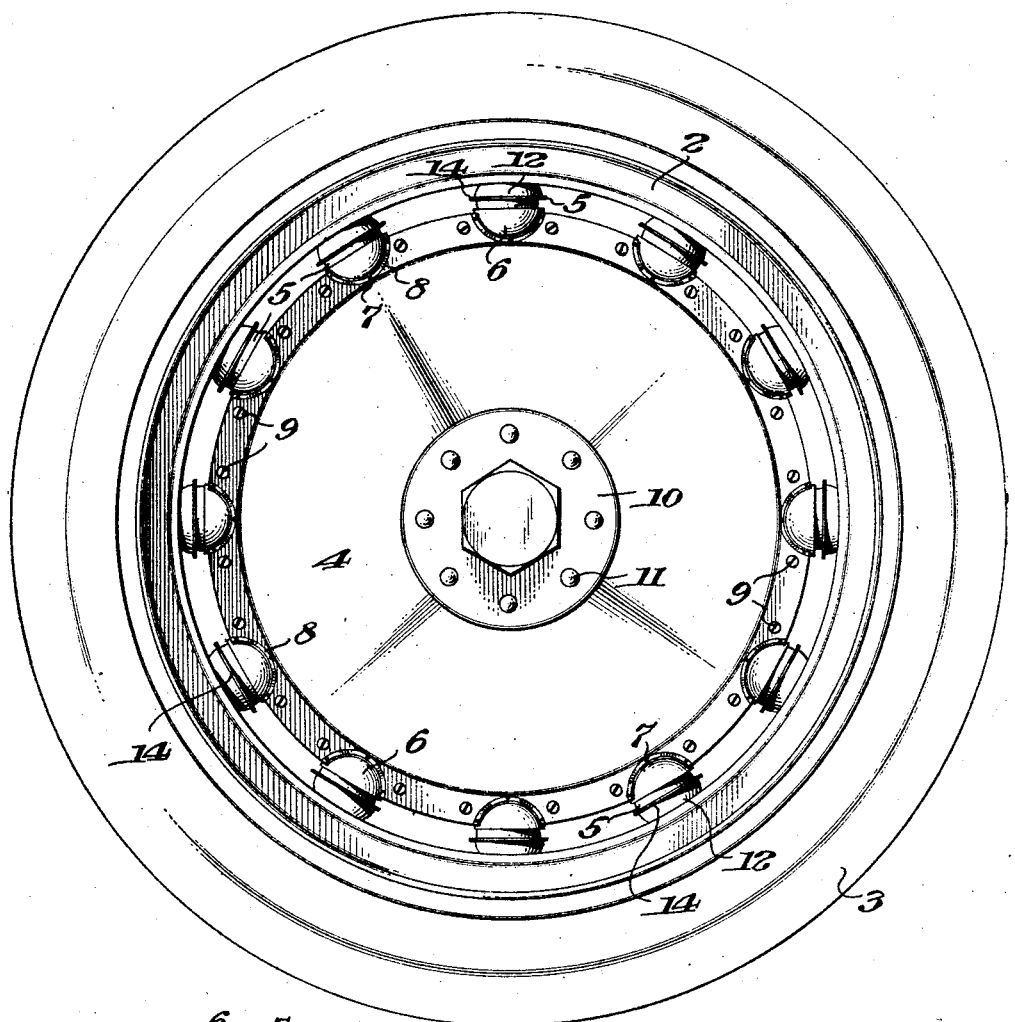
Fig. 1 is a side view of one form of wheel.

The numeral 1 represents a hub of ordinary construction; and 2, is a rim to which the tire 3 is attached.

The particular wheel illustrated is of the disk type, and the numeral 4 represents the disks, although it is understood that spokes or any other form of connection might extend from the hub to the rim of the wheel. Resilient insulating balls 5 which may be hollow or solid, and preferably made of rubber are interposed at intervals between the discal center 4 of the wheel and the rim 2, and these might be held in various ways.

Figure 4:
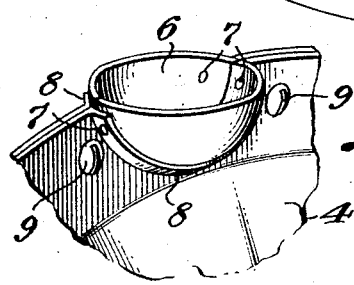
Fig. 4 is a detail.

In the preferred construction, cups 6 are made in halves as shown in detail in Fig. 4, and these are held by rivets 7 or other means to the flanges 8 of the disks, thus forming fixed sockets for the balls 5. The disks 4 are held together by bolts 9, and the disks are fastened to the flanges 10 of the hub by bolts 11. In this way, a rigid structure is formed from the hub 1 to the balls 5.

Figure 2:
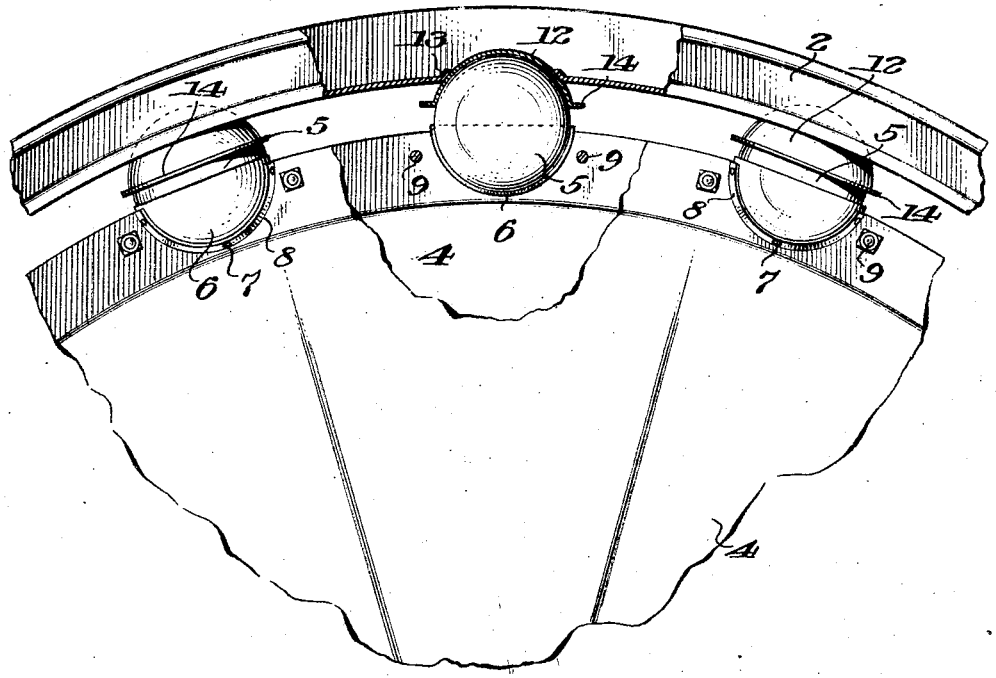
Fig. 2 is a fragmentary view with parts broken away and partly in section.
Figure 3:
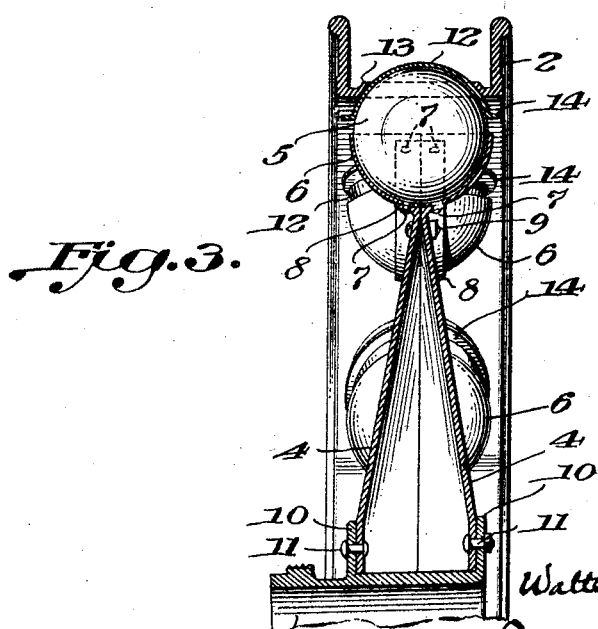
Fig. 3 is a transverse section.

Loose or floating cups 12, one for each ball 5, are movably held in seats 13 borne by flanges struck outwardly, and in shape to conform to the outer surface of the movable or floating cups, as shown in Figs. 2 and 3.

These movable or floating cups 12 preferably terminate in an outturned flange 14 at the outer edge as a means for limiting the turning and rocking or folding movement of the cups, and also to afford strength and give a finish to the cups. They also protect the balls, which otherwise might be pinched and cut as they are compressed, and as the rim and discal center tend to exert strain upon each other.

The movable or floating cups 12 lend themselves readily to both rotary and lateral pull and strain, the outer or movable cups being self-adjusting.

In this way, a resilient, insulating, ball and socket connection is formed between the center and rim of the wheel, thus forming a cushion wheel which has universal resiliency permitting limited movement of the inner and outer structures of the wheel in all directions with respect to each other, due to the fact that the sole connection between the center structure and the rim is the resilient insulating cushions of rubber or equivalent material, which are of such size, strength and arrangement that they not only yield to the requirements of strain and pressure but also instantly resume their normal condition, and restore the parts to normal relation.

I claim:

1. A vehicle wheel including center and rim structures, complementary half-cups secured to the periphery of the center structure, and shock insulating means interposed between the half-cups and the rim.

2. A vehicle wheel including center and rim structures, complementary half-cups secured to the periphery of the center structure. cups connected with the rim, and shock insulating means interposed between the half-cups and the cups connected with the rim.

3. A vehicle wheel including hub and rim structures, shock-insulating means interposed therebetween, complementary half cups having rigid connection with the hub structure, and floating cups movably connected with the rim structure, said cups receiving and supporting the shock insulating means therebetween.

4. A vehicle wheel including a center structure having sockets at its periphery, a rim having orifices therein and opposite said sockets, cups movably supported in said orifices, and shock insulating means held between said sockets and cups.

5. A vehicle wheel including a center structure having sockets at its periphery, a rim having flanged orifices opposite said sockets, cups movably supported in said flanged orifices, and shock insulating means held between said sockets and cups.

6. In a vehicle wheel, the combination with a hub, disks secured to each other and to the hub, complementary half cups secured in recesses at intervals in the periphery of the disks, of a rim having orifices opposite the half cups secured to the disks, cups seated in said orifices, and shock insulating means interposed between the cups of the disks and of the rim.

7. In a vehicle wheel, the combination with a hub, disks secured to each other and to the hub, complementary half cups secured in recesses at intervals in the periphery of the disks, of a rim having flanged orifices opposite the half cups secured to the disks, and flanged cups movably supported in the flanged orifices, and shock-insulating means interposed between the flanged cups and the cups at the periphery of the disks.

8. A vehicle wheel including a center structure having sockets opening radially at its periphery, a rim having orifices therein and opposite the sockets, floating cups in the orifices, and shock insulating means interposed between the cups and sockets.

9. A vehicle wheel including a center structure having sockets opening radially at its periphery, a rim having orifices therein and opposite said sockets and shock insulating means interposed between the orifices and sockets.

In testimony whereof I affix my signature.

WALTER S. JOSEPHSON.